United States Patent [19]

Crain et al.

[11] Patent Number: 5,070,620

[45] Date of Patent: Dec. 10, 1991

[54] EXTENSIBLE AND RETRACTABLE ROD

[76] Inventors: Stephen B. Crain, 2738 Gordonville Rd., Cape Girardeau, Mo. 63701; Jeffrey A. Crain, 118 N. Reader, Mounds, Ill. 62964

[21] Appl. No.: 486,970

[22] Filed: Mar. 1, 1990

[51] Int. Cl.$^5$ .......................... G01C 15/00; F16B 7/10
[52] U.S. Cl. ................................. 33/296; 33/809; 403/324; 403/109
[58] Field of Search .................... 33/809–812, 33/452, 296; 403/109, 324, 328; 81/177.2, 177.1

[56] References Cited

U.S. PATENT DOCUMENTS

| Re. 32,815 | 1/1989 | Smith | 33/809 |
|---|---|---|---|
| 861,929 | 7/1907 | Wulff | |
| 1,014,547 | 1/1912 | Willis | |
| 1,299,627 | 4/1919 | Simon | |
| 2,088,394 | 7/1937 | Wright | 33/74 |
| 2,291,593 | 7/1942 | Hubbard | |
| 2,525,644 | 10/1950 | Brunson | 154/91 |
| 2,606,050 | 8/1952 | Morris | 287/58 |
| 2,980,456 | 4/1961 | McMullin | 287/58 |
| 3,103,375 | 9/1963 | McMullin | 287/58 |
| 3,239,255 | 3/1966 | Murcott | 287/58 |
| 3,492,737 | 2/1970 | Swanson | 33/809 |
| 3,526,040 | 9/1970 | Young | 33/809 |
| 3,980,409 | 9/1976 | Turner | 403/108 |
| 4,047,821 | 9/1977 | Hoke et al. | 403/109 |
| 4,079,978 | 3/1978 | McMullin | 294/19 |
| 4,318,228 | 3/1982 | Kimura | 33/809 |
| 4,385,849 | 5/1983 | Crain | 403/109 |

FOREIGN PATENT DOCUMENTS

| 33994 | 11/1970 | Australia | 33/296 |
|---|---|---|---|
| 615379 | 1/1927 | France | |
| 584546 | 2/1947 | United Kingdom | |

Primary Examiner—William A. Cuchlinski, Jr.
Assistant Examiner—Alvin Wirthlin
Attorney, Agent, or Firm—Senniger, Powers, Leavitt & Roedel

[57] ABSTRACT

An extensible and retractable rod including an outer section and an inner section telescopically received in the outer section for extension and retraction relative thereto. The outer section has an opening therein including an upper peripheral edge. A detent member associated with the inner section is spring biased to move laterally of the inner section to releasably lock the inner section in an extended position relative to the outer section. The detent member has an upper surface and a lower surface, each having a laterally outer edge, and a laterally outwardly facing surface extending between the laterally outer edges of the upper and lower surfaces. The laterally outwardly facing surface includes a camming surface which engages the outer section at the lower peripheral edge of the opening for pivoting the detent member so that the upper surface of the detent member projects into the opening in the outer section as the detent member begins to move into registration with the opening. The upper surface of the detent member engages the upper peripheral edge of the opening upon further extension of the inner section to stop the extension of the inner section when the detent member is in full registration with the opening. The detent member then pivots to its outward position in which the upper and lower surfaces of the detent member project no more than a small distance outwardly beyond the outer section.

17 Claims, 2 Drawing Sheets

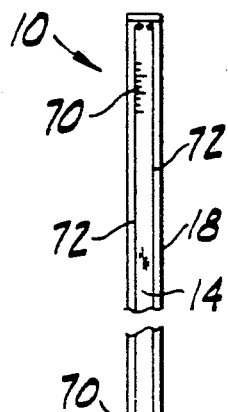
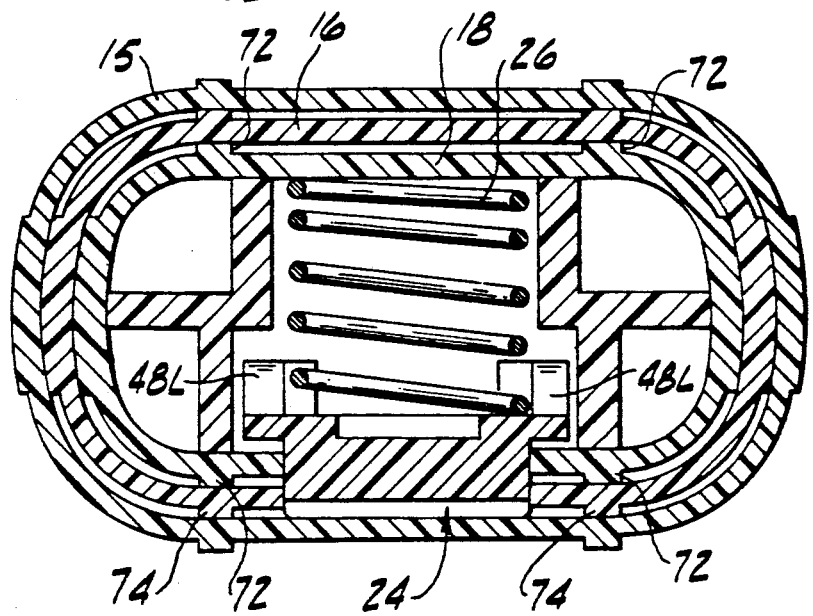
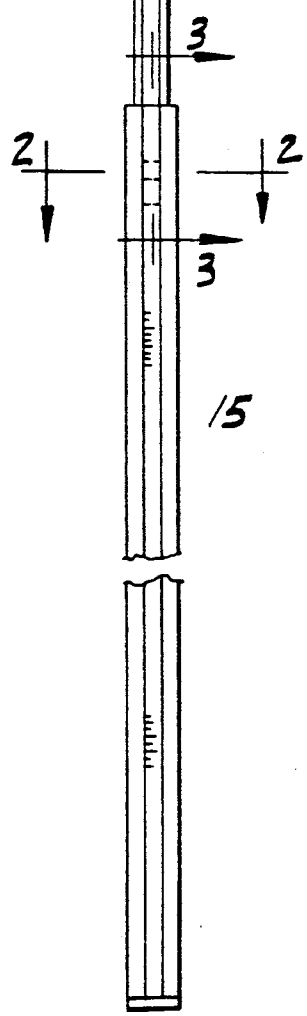
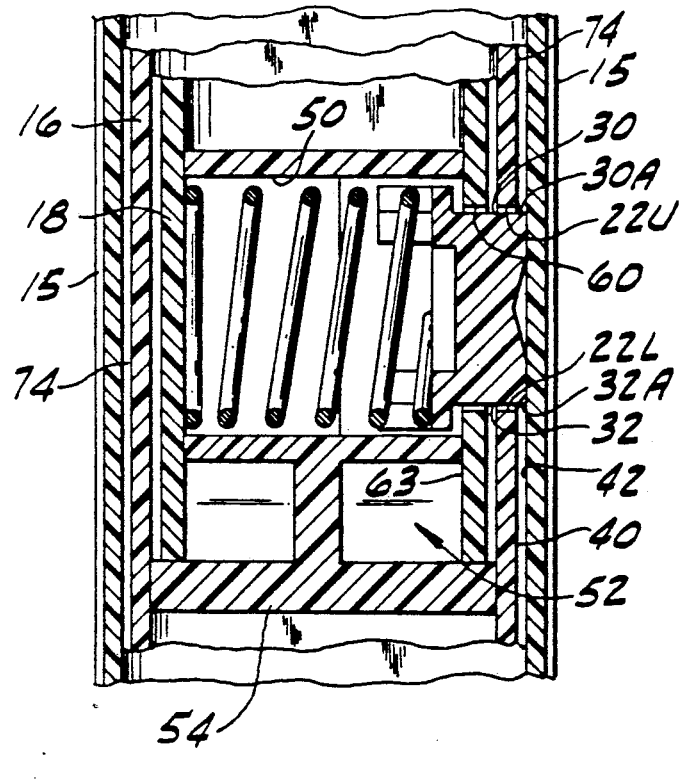

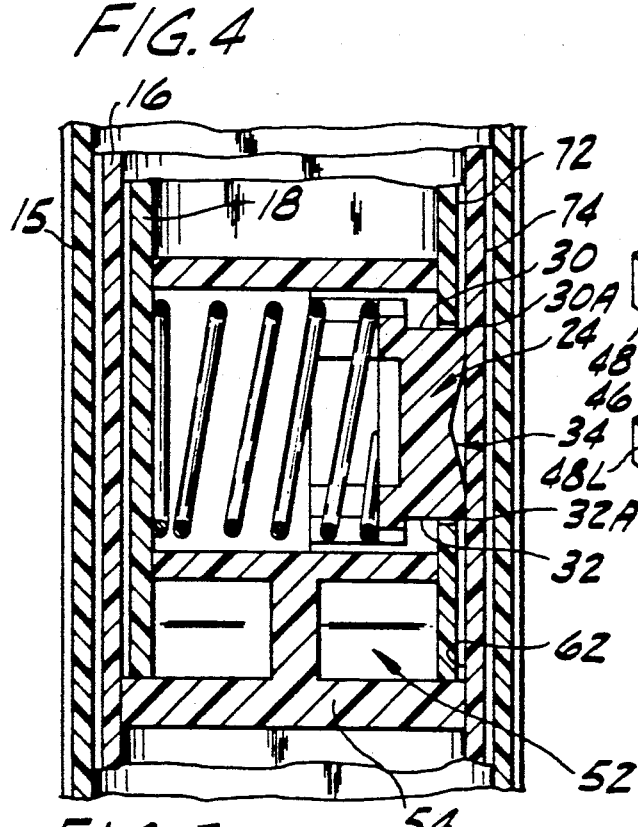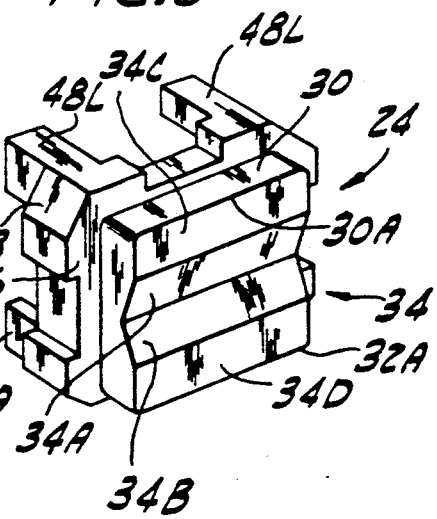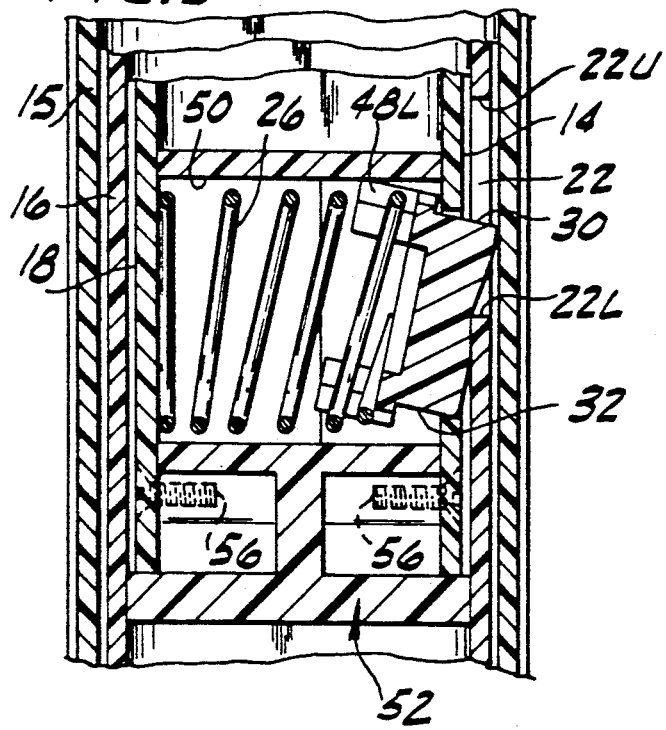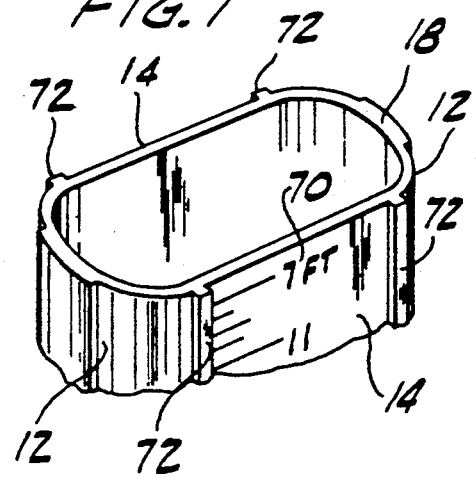

EXTENSIBLE AND RETRACTABLE ROD

BACKGROUND OF THE INVENTION

This invention relates generally to multisection telescoping rods and more particularly, to telescoping measuring rods (e.g., leveling rods).

As sections of a telescoping rod reach their full extended position with respect to each other, the sections should lock to hold the sections in a fixed position of extension, allowing neither further extension nor retraction of the sections relative to one other. However, the locking mechanism must also be easily releasable for retraction of the inner section. Reference may be made to U.S. Pat. Nos. 4,385,849 and 4,318,228 describing extensible and retractable rods generally in the field of this invention.

U.S. Pat. No. 4,318,228 shows a leveling pole which has multiple telescoping sections with a locking mechanism for holding adjacent sections in a fixed position of extension with respect to each other. The locking mechanism comprises a locking button mounted on a coil compression spring in an inner section. The spring biases the button outwardly so that the button will move in a substantially straight line into an opening in an outer section immediately adjacent the inner section, to lock the sections. The locking button has an outwardly facing surface sloping continuously inwardly from top to bottom of the button. As the locking button begins to register with the opening in the outermost section, the upper portion of the locking button begins to project into the opening because of the inward slope of the locking button's outwardly facing surface. When the lower edge of the locking button registers with the opening, the locking button springs into its full outward position so that a lower surface of the locking button is engageable with the lower edge of the opening and the upper surface of the locking button is engageable with the upper edge of the opening to hold the inner and outer sections in an extended position.

Because the outwardly facing surface of the locking button shown in U.S. Pat. No. 4,318,228 slopes continuously inwardly from top to bottom when the button is in its locking position, the outer edge of its lower surface is positioned inwardly of the outer edge of its upper surface. Therefore, to be positioned for engagement with the lower edge of the opening, the locking button must project through the opening in the outer section far enough to bring its lower surface over the lower edge of the opening. Accordingly, the outer edge of the upper surface must project a relatively substantial distance beyond the outer surface of the outer section. This arrangement works satisfactorily so long as the outer section has been extended from a next outer section, immediately adjacent the outer section, so that the opening in the section is clear of the inner surface of the next outer section. Absent this clearance, the locking button could not project through the opening far enough before engaging the inner surface of the next outer section to allow its lower surface to be positioned for engagement with the lower edge of the opening in the outer section. Thus, there would be nothing to hold the inner section from retracting relative to the outer section.

Certain leveling rods operate by extension of their innermost sections first, with the level being read at the top of the outermost section of the rod. In this design, adjacent inner and outer sections must be able to lock while the opening in the outer section is positioned inside of the next outer section. With respect to this type of rod, use of the locking button shown in U.S. Pat. No. 4,318,228 would be unsatisfactory because the locking button could not project through the opening far enough to allow its lower surface to be positioned for engagement with the lower edge of the opening. Thus, there would be nothing to hold the inner section from retracting. Additional space could be provided between the outer section and succeeding outer section, such as by increasing the diameter of the next outer section. However, because a leveling rod is typically made up of a number of interlocking sections, the outermost section would have to be of relatively large diameter, making the rod more difficult to manipulate.

In another aspect, the outer surfaces of each section of a leveling rod have indicia, usually in feet, on an outer surface of the section. These indicia are typically painted on the sections, and are gradually worn off by the frictional engagement of adjacent sections as they are extended and retracted with respect to each other. This necessitates periodic disassembly of the leveling rod and repainting of the indicia, which is time consuming and causes increased down time and maintenance cost.

SUMMARY OF THE INVENTION

Among the several objects of the present invention may be noted the provision of an extensible and retractable rod which positively but releasably locks adjacent sections of the rod in an extended position; the provision of such a rod which is compact, in design, requiring a minimum of space between adjacent sections of the rod for the operation of the locking mechanism; the provision of such a rod which is reliably stopped from further extension of adjacent sections upon reaching maximum extension; and the provision of such a rod which is durable and requires a minimum of maintenance.

Generally, an extensible and retractable rod of the present invention comprises an outer section and an inner section telescopically received in the outer section for extension and retraction relative thereto. The outer section has a laterally outwardly facing opening therein including an upper peripheral edge and a lower peripheral edge. A detent member associated with the inner section is adapted for movement laterally of the inner section from an inward position to an outward position for releasably locking the inner section in an extended position relative to the outer section, and means is provided for biasing the detent member toward its outward position. The detent member has an upper surface extending generally laterally with respect to the inner section and having a laterally outer edge, a lower surface extending generally laterally with respect to the inner section and having a laterally outer edge, and a laterally outwardly facing surface extending between the laterally outer edges of the upper and lower surfaces. The laterally outwardly facing surface is inwardly depressed relative to the laterally outer edges of the upper and lower surfaces. The laterally outwardly facing surface includes a camming surface adapted upon extension of the inner section relative to the outer section to engage the outer section at the lower peripheral edge of the opening for pivoting the detent member about a generally laterally extending axis such that the upper surface of the detent member projects into the opening in the outer section as the detent member begins to move into registration with the opening. The upper surface of the detent member is adapted to engage the upper peripheral edge of the opening upon further extension of the inner section to stop the extension of the inner section when the detent member is in full registration with the opening. The detent member is then adapted to pivot about the generally laterally extending axis to its outward position so that the lower surface of the detent member projects into the opening and the laterally outer edges of the upper and lower surfaces lie generally in a plane parallel to the longitudinal extension of the inner and outer sections. In the outward, locking position, the upper and lower surfaces of the detent member project no more than a small distance outwardly beyond the outer section.

Other objects and features will be in part apparent and in part pointed out hereinafter.

BRIEF DESCRIPTION OF THE DRAWINGS

FIG. 1 is an elevation of a three section rod of the present invention, the inner section being shown extended with respect to the outer section;

FIG. 2 is an enlarged section of the rod taken in the plane including line 2—2 of FIG. 1;

FIG. 3 is an enlarged, fragmentary section of the rod taken in the plane including line 3—3 of FIG. 1, showing a detent member in its locking position;

FIG. 4 is a fragmentary section of the rod showing the detent member in an unlocked position for extension and retraction of the rod;

FIG. 5 is a fragmentary section of the rod showing the detent member in partial registration with an opening in the lower section upon extension of the upper section;

FIG. 6 is a perspective of the detent member; and

FIG. 7 is a fragmentary perspective of an open end of an inner section.

Corresponding reference characters indicate corresponding parts throughout the several views of the drawings.

DETAILED DESCRIPTION OF THE PREFERRED EMBODIMENT

Referring now to the drawings, an extensible and retractable rod, generally indicated at 10, is shown as comprising a plurality of tubular sections which are telescopically assembled for extension and retraction relative to one another. As shown in FIG. 7, each section is generally ovoid (racetrack) in shape, having curved ends 12 and generally planar faces 14 extending between the ends. By way of example, three tubes, including an outermost section 15, an outer section 16 telescopically received in the outermost section, and an inner section 18 telescopically received in the outer section, have been shown in the drawings. However, it is to be understood that two or more sections may be used.

The construction of the outer and inner sections 16, 18 of the rod is such that when the inner section reaches a fully extended position with respect to the outer section, the extension of the inner section is stopped and the sections releasably lock so that the inner section can neither extend nor retract with respect to the outer section. More specifically, the outer section 16 of the rod has a laterally outwardly facing rectangular opening 22 which includes an upper peripheral edge 22U and a lower peripheral edge 22L (FIG. 5). A detent member indicated generally at 24, and associated with the inner section 18 is adapted for movement laterally of the inner section from an inward position (FIG. 4) into the opening 22 to an outward position (FIG. 3) for releasably locking the inner section in its extended position relative to the outer section 16. Means comprising a coil compression spring 26 biases the detent member 24 toward its outward position. The outer section 16 has similar structure (not shown) for releasably locking with the outermost section 15 upon extension therefrom.

As shown in FIG. 6, the detent member 24 includes an upper surface 30 which extends generally laterally with respect to the inner section 18 and which has a laterally outer edge 30A. A lower surface 32, spaced from and substantially parallel to the upper surface 30, also extends generally laterally of the inner section 18 and has a laterally outer edge 32A. A laterally outwardly facing surface, designated in its entirety by the numeral 34, extends between the laterally outer edges 30A, 32A of the upper and lower surfaces, and is in part inwardly depressed relative to the laterally outer edges. The laterally outwardly facing surface 34 includes a first generally planar face 34A angling inwardly and downwardly from generally adjacent the laterally outer edge 30A of the upper surface. A second generally planar face 34B angles inwardly and upwardly from generally adjacent the laterally outer edge 32A of the lower surface. The first and second faces 34A, 34B define a V-shaped recess or depression in the laterally outwardly facing surface 34. It is to be understood that the recess could have other shapes and still fall within the scope of the present invention. A third face 34C extends between the laterally outer edge 30A of the upper surface and an upper edge of the first face 34A, and a fourth face 34D, substantially coplanar with the third face, extends between the laterally outer edge 32A of the lower surface and a lower edge of the second face 34B.

In this embodiment, the first face 34A of the detent member 24 constitutes a camming surface adapted upon extension of the inner section 18 relative to the outer section 16 to engage the outer section at the lower peripheral edge 22L of the opening (FIG. 5). The interaction of the camming surface 34A with the lower peripheral edge 22L of the opening and the force applied by the spring 26 as the detent member 24 begins to move into registration with the opening 22, causes the detent member to pivot about a generally laterally extending axis so that the upper surface 30 moves into the opening. Upon further extension of the inner section 18, the upper surface 30 engages the upper peripheral edge 22U of the opening, thus acting as a stop to halt the extension of the inner section when the detent member 24 is in full registration with the opening 22.

At the time of registration with the opening 22, the laterally outer edge 32A of the detent member's lower surface 32 clears the lower peripheral edge 22L of the opening and the detent member 24 pivots about the generally laterally extending axis in a direction opposite to its initial pivoting motion. The detent member 24 thus assumes its full outward position with its lower surface 32 projecting into the opening 22 and positioned over the lower peripheral edge 22L of the opening for engagement with the lower peripheral edge to hold the inner section 18 from retracting into the outer section 16. The vertical dimensions of the opening 22 and the detent member 24 closely correspond so that the relative longitudinal position of the outer and inner sections 16, 18 is positively fixed within a very close tolerance. The outer and inner sections 16, 18 may be unlocked by pressing the detent member 24 inward so that the upper and lower surfaces 30, 32 clear the upper and lower peripheral edges 22U, 22L of the opening.

Because the upper surface 30 of the detent member 24 moves into the opening 22 prior to full registration of the detent member with the opening, the upper surface is presented for engagement with the upper peripheral edge 22U of the opening before the detent member registers in the opening, thereby ensuring such engagement even if the sections are rapidly extended. If full registration were required before the detent member began to move laterally into the opening, there would be a risk, especially if the extension were rapid, that the detent member would move past the opening without locking, in which case the sections might be inadvertently pulled apart. This risk is especially great if there is a close tolerance between the vertical dimension of a detent member and the vertical dimension of an opening in an outer section, since this close tolerance can result in interference between the outer section and the detent member at the opening. The pivoting action of the detent member of the present invention solves this problem while maintaining a close tolerance fit between the detent member and its opening to insure that the sections are locked in precise position when extended relative to one another.

The rod 10 of the present invention has been designed so that only a minimal gap is required between the outer section 16 and the outermost section 15 in order for the detent member 24 to function as a stop to further extension of the inner section 18 from the outer section. In this regard it will be noted that the laterally outer edges 30A, 32A of the upper and lower surfaces lie in a plane generally parallel to the longitudinal extension of the outer and inner sections 16, 18. Unlike the locking button of U.S. Pat. No. 4,318,228, which has a continuously inwardly sloping, outwardly facing surface, the upper surface 30 of the detent member of the present invention does not need to project beyond the outer section 16 any further than the lower surface 32 to position the lower surface for engagement with the lower peripheral edge 22L of the opening. The detent member 24 thus need only project no more than a small distance beyond the outer section 16 to assure positioning its upper and lower surfaces 30, 32 in the opening 22. Therefore, the radial dimension of the outer section 16 and the outermost section 15 may closely correspond, with the outer surface 40 of the outer section and the inner surface 42 of the outermost section in closely spaced relation (FIG. 3). The close fit of the adjacent sections allows the outside radial dimension of the outermost section of the rod to remain relatively small for ease of handling.

As noted above, the rod 10 is assembled from three (this number may vary) sections which are hollow and open at both ends. The detent member 24 has a base 46 at the laterally inner ends of its upper and lower surfaces 30, 32 and a skirt 48 including four legs 48L projecting inwardly from the base. The detent member 24 is mounted on the spring 26 by fitting the spring inside the skirt 48 and between the legs 48L which are sized for a friction fit of the spring therein. The detent member and spring are positioned in a passageway 50 of a channel member generally indicated at 52, and the channel member is disposed in an open end of the inner section 18. As shown in FIG. 5, the passageway 50 of the channel member is larger than the detent member 24 and spring 26, which allows room for pivoting of the detent member. The channel member 52 has an integrally formed end-piece 54 which closes off the open end of the inner section 18 upon insertion of the channel member therein (FIG. 4). Screws 56 secure the channel member to the inner section 18 (FIG. 5).

When positioned in the inner section 18, the detent member 24 registers in an opening 60 in the inner section (FIG. 3). As may be seen in FIG. 4, the laterally outwardly facing surface 34 of the detent member engages the inner surface 62 of the outer section 16, holding the detent member in its inward position as the outer and inner sections are extended and retracted relative to each other. The base 46 of the detent member 24 is larger than the opening 60 in the inner section 18 and serves as a stop to limit the laterally outward motion of the detent member when it is in registration with the opening 22 in the outer section 16. The lateral dimension of the upper and lower surfaces 30, 32 of the detent member from their laterally inner edges to their laterally outer edges 30A, 32A is only slightly greater than the distance from an inner surface 63 of the inner section 18 to the face 14 of the outer section 16. Therefore, the upper and lower surfaces 30, 32 of the detent member 24 project no more than a small distance beyond the face 14 of the outer section 16.

The planar faces 14 of the outer and inner sections 16, 18 have indicia (e.g., graduated markings and numerals in feet and tenths of feet) on them. These indicia, indicated generally at 70, are applied by painting them on the faces 14, but could also be applied by adhering a preprinted tape to the face of the section, or by other suitable means. Spacer means, comprising a pair of generally parallel spaced apart ribs 72 extending longitudinally of the inner section on opposite sides of both faces 14 of the inner section 18, maintains a gap between the outer section 16 and the faces 14 of the inner section. The ribs 72 project outwardly from the faces 14 only a small distance so that the outer section 16 does not engage the faces of the inner section, but is closely adjacent both faces. Similar ribs 74 on the outer section 16 maintain a small gap between its outer surface 40 and the outermost section 15. Because the ribs 72, 74 are the bearing surfaces during extension and retraction of the sections, the indicia 70 are protected from wear. Therefore, the rod 10 may be used for extended periods of time without having to disassemble it and repaint the indicia 70.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An extensible and retractable rod comprising an outer section and an inner section telescopically received in the outer section for extension and retraction relative thereto, the outer section having a laterally outwardly facing opening therein including an upper peripheral edge and a lower peripheral edge, a detent member associated with the inner section adapted for movement laterally of the inner section from an inward position to an outward position for releasably locking the inner section in an extended position relative to the outer section, and means biasing the detent member toward its outward position, the detent member comprising an upper surface extending generally laterally with respect to the inner section and having a first laterally outer edge, a lower surface extending generally laterally with respect to the inner section and having a second laterally outer edge, the first and second laterally outer edges lying generally in a plane, and a laterally outwardly facing surface extending between the laterally outer edges of the upper and lower surfaces, the laterally outwardly facing surface being inwardly depressed relative to the laterally outer edges of the upper and lower surfaces, the laterally outwardly facing surface including a camming surface extending generally inwardly from said plane including the first and second laterally outer edges, the camming surface being adapted upon extension of the inner section relative to the outer section to engage the outer section at the lower peripheral edge of the opening for pivoting the detent member about a generally laterally extending axis such that the upper surface of the detent member projects into the opening in the outer section as the detent member begins to move into registration with the opening, the upper surface of the detent member being adapted to engage the upper peripheral edge of the opening upon further extension of the inner section to stop the extension of the inner section when the detent member is in full registration with the opening, the detent member then being adapted to pivot about said generally laterally extending axis to its outward position so that the lower surface of the detent member projects into the opening and said plane including the laterally outer edges of the upper and lower surfaces is generally parallel to the longitudinal extension of the inner and outer sections, with the upper and lower surfaces of the detent member projecting no more than a small distance outwardly beyond the outer section.

2. An extensible and retractable rod as set forth in claim 1 wherein the laterally outwardly facing surface of the detent member comprises a first generally planar face angling inwardly and downwardly from generally adjacent the first laterally outer edge of the upper surface of the detent member, and a second generally planar face angling inwardly and upwardly from generally adjacent the second laterally outer edge of the lower surface of the detent member.

3. An extensible and retractable rod as set forth in claim 2 wherein the camming surface comprises said first face of the laterally outwardly facing surface of the detent member.

4. An extensible and retractable rod as set forth in claim 2 wherein the laterally outwardly facing surface of the detent member further comprises a third generally planar face extending between the first laterally outer edge of the upper surface of the detent member and an upper edge of said first face, and a fourth generally planar face extending between the laterally outer edge of the lower surface of the detent member and a lower edge of said second face.

5. An extensible and retractable rod as set forth in claim 4 wherein said third and fourth faces of the laterally outwardly facing surface of the detent member are generally coplanar.

6. An extensible and retractable rod as set forth in claim 1 further comprising spacer means for maintaining a small gap between the outer section and a face of the inner section having indicia thereon.

7. An extensible and retractable rod as set forth in claim 6 wherein said spacer means comprises a pair of generally parallel spaced apart ribs extending longitudinally of the inner section on opposite sides of the face of the inner section having indicia thereon for substantially the entire length of the inner section, the ribs projecting laterally outwardly from said face.

8. An extensible and retractable rod as set forth in claim 1 wherein the inner section has an opening therein generally aligned with the detent member, and wherein the detent member further comprises a base located generally at the laterally inner ends of the upper and lower surfaces of the detent member, the base being sized larger than the opening in the inner section, and wherein the dimension of the upper and lower surfaces of the detent member from their laterally inner edges to their laterally outer edges is only slightly greater than the distance from the inner surface of the inner section to the outer surface of the outer section.

9. An extensible and retractable rod as set forth in claim 1 wherein said means for biasing the detent member toward said outward position comprises a spring held in the inner section, the detent member being mounted on one end of the spring.

10. An extensible and retractable rod as set forth in claim 9 further comprising a channel member positioned in the inner section, the channel member having a laterally extending passageway therethrough adapted to receive the spring and the detent member, the passageway being sized larger than the detent member to allow the detent member to pivot about said generally laterally extending axis in the passageway.

11. An extensible and retractable rod comprising an outer section and an inner section telescopically received in the outer section for extension and retraction relative thereto, the inner section having a face with indicia thereon extending substantially the full length of the inner section, and a pair of generally parallel spaced apart ribs extending substantially the entire length of the inner section at opposite sides of said face, the ribs protruding outwardly from the periphery of said face and being engageable with the outer section for maintaining a small space between the outer section and said face of the inner section, the outer section having a laterally outwardly facing opening therein including an upper peripheral edge and a lower peripheral edge, a detent member associated with the inner section adapted for movement laterally of the inner section from an inward position to an outward position for releasably locking the inner section in an extended position relative to the outer section, and a spring biasing the detent member toward its outward position, the detent member comprising an upper surface extending generally laterally with respect to the inner section and having a first laterally outer edge, a lower surface extending generally laterally with respect to the inner section and having a second laterally outer edge, the first and second laterally outer edges lying generally in a plane, and a laterally outwardly facing surface extending between the laterally outer edges of the upper and lower surfaces, the laterally outwardly facing surface being inwardly depressed relative to the laterally outer edges of the upper and lower surfaces, the laterally outwardly facing surface including a camming surface extending generally inwardly from said plane including the first and second laterally outer edges, the camming surface being adapted upon extension of the inner section relative to the outer section to engage the outer section at the lower peripheral edge of the opening for pivoting the detent member about a generally laterally extending axis such that the upper surface of the detent member projects into the opening in the outer section as the detent member begins to move into registration with the opening, the upper surface of the detent member being adapted to engage the upper peripheral edge of the opening upon further extension of the inner section to stop the extension of the inner section when the detent member is in full registration with the opening, the detent member then being adapted to pivot about said generally laterally extending axis to its said outward position so that the lower surface of the detent member projects into the opening and said plane including the laterally outer edges of the upper and lower surfaces is generally parallel to the longitudinal extension of the inner and outer sections, with the upper and lower surfaces of the detent member projecting no more than a small distance outwardly beyond the outer section.

12. An extensible and retractable rod as set forth in claim 11 wherein the laterally outwardly facing surface of the detent member comprises a first generally planar face angling inwardly and downwardly from generally adjacent the first laterally outer edge of the upper surface of the detent member, and a second generally planar face angling inwardly and upwardly from generally adjacent the second laterally outer edge of the lower surface of the detent member.

13. An extensible and retractable rod as set forth in claim 12 wherein said camming surface comprises said first face of the laterally outwardly facing surface of the detent member.

14. An extensible and retractable rod as set forth in claim 12 wherein the laterally outwardly facing surface of the detent member further comprises a third generally planar face extending between the first laterally outer edge of the upper surface of the detent member and an upper edge of said first face, and a fourth, generally planar face extending between the second laterally outer edge of the lower surface of the detent member and a lower edge of said second face.

15. An extensible and retractable rod as set forth in claim 14 wherein said third and fourth faces of the laterally outwardly facing surface of the detent member are generally coplanar.

16. An extensible and retractable rod as set forth in claim 11 wherein the inner section has an opening therein generally aligned with the detent member, and wherein the detent member further comprises a base located generally at the laterally inner ends of the upper and lower surfaces of the detent member, the base being sized larger than the opening in the inner section, and wherein the dimension of the upper and lower surfaces of the detent member from their laterally inner edges to their laterally outer edges is only slightly greater than the distance from the inner surface of the inner section to the outer surface of the outer section.

17. An extensible and retractable rod as set forth in claim 11 further comprising a channel member positioned in the inner section, the channel member having a passageway therethrough adapted to receive the spring and the detent member, the passageway being sized larger than the detent member to allow the detent member to pivot about said generally laterally extending axis.

* * * * *